United States Patent [19]
Goestenkors et al.

[11] Patent Number: 5,303,951
[45] Date of Patent: Apr. 19, 1994

[54] AIR BAG ASSEMBLY WITH HOUSING AND FASTENERLESS DEPLOYMENT DOOR

[75] Inventors: Gregory N. Goestenkors, Waterford; Darin J. Turner, Warren; Mohamed Boumarafi, Rochester Hills, all of Mich.

[73] Assignee: Allied-Signal Inc., Morristown, N.J.

[21] Appl. No.: 968,751

[22] Filed: Oct. 30, 1992

[51] Int. Cl.⁵ ............................................. B60R 21/16
[52] U.S. Cl. ................................. 280/728 B; 280/732
[58] Field of Search ........... 280/728 A, 728 B, 730 R, 280/732

[56] References Cited

U.S. PATENT DOCUMENTS

| | | | |
|---|---|---|---|
| 4,893,833 | 1/1990 | DiSalvo et al. | 280/732 |
| 4,989,897 | 2/1991 | Takada | 280/728 B |
| 5,167,427 | 12/1992 | Baba | 280/728 A |

*Primary Examiner*—Margaret A. Focarino
*Assistant Examiner*—Paul Dickson
*Attorney, Agent, or Firm*—Markell Seitzman

[57] ABSTRACT

An assembly for an air bag (56) adapted to fit within an opening (22) in a panel in the vehicle interior such as an instrument panel. The assembly comprises a housing (44) including a first wall (100) and an opposite second wall (102), a flexible wall member (106) secured to the first wall (100) defining a space (132) therebetween to receive a hinge portion of the deployment door. One of the first wall (100) and flexible wall members (106) includes a plurality of depressions or first tabs (112) which extend into the space (132) to provide a mechanism to engage and lock the hinge portion of the deployment door in place. The second wall (102) includes at least one louver (122) forming a pocket (123) and a plurality of outwardly extending tabs (120) which provide a mechanism to engage and lock in place a tear seam portion of the deployment door.

8 Claims, 4 Drawing Sheets

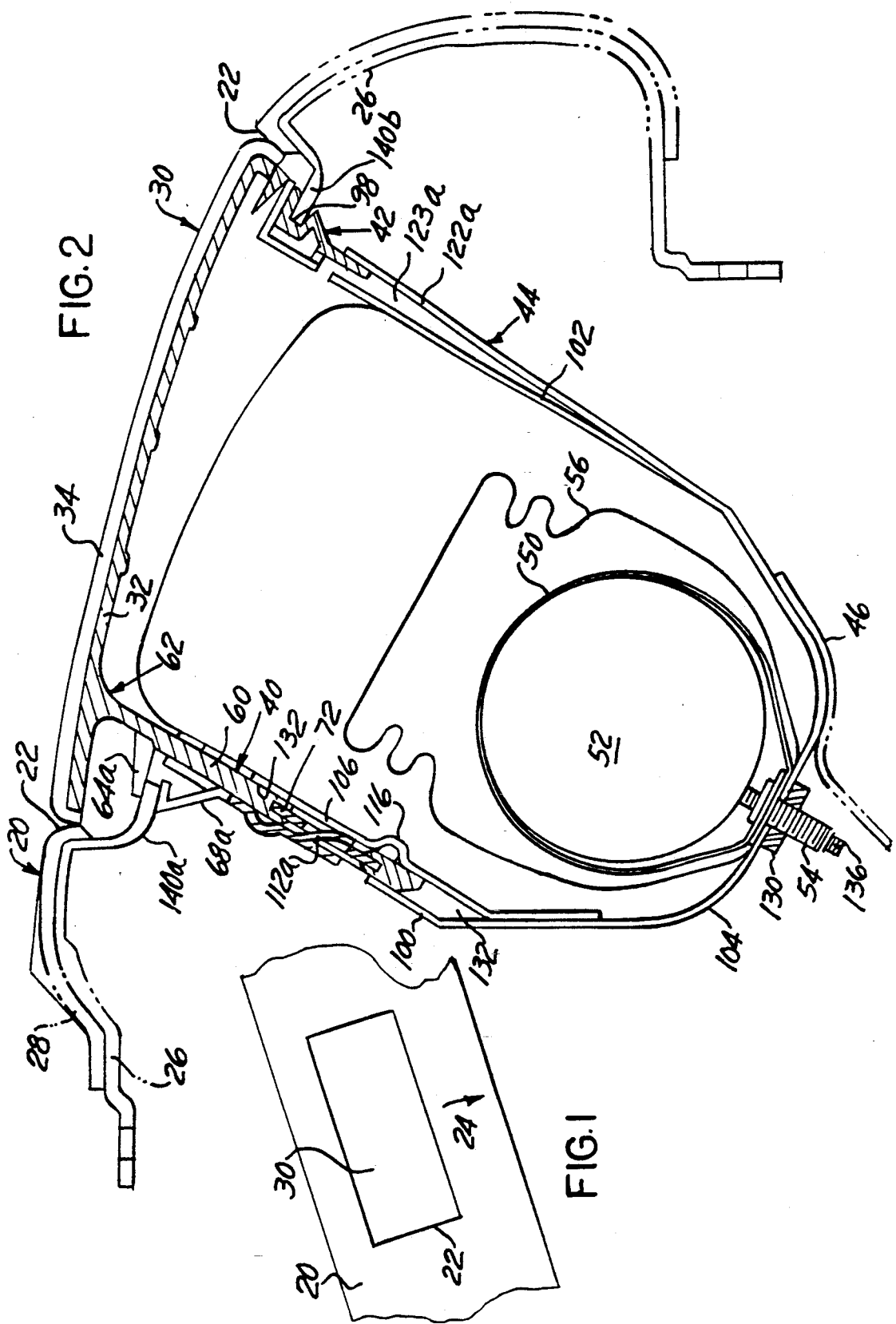

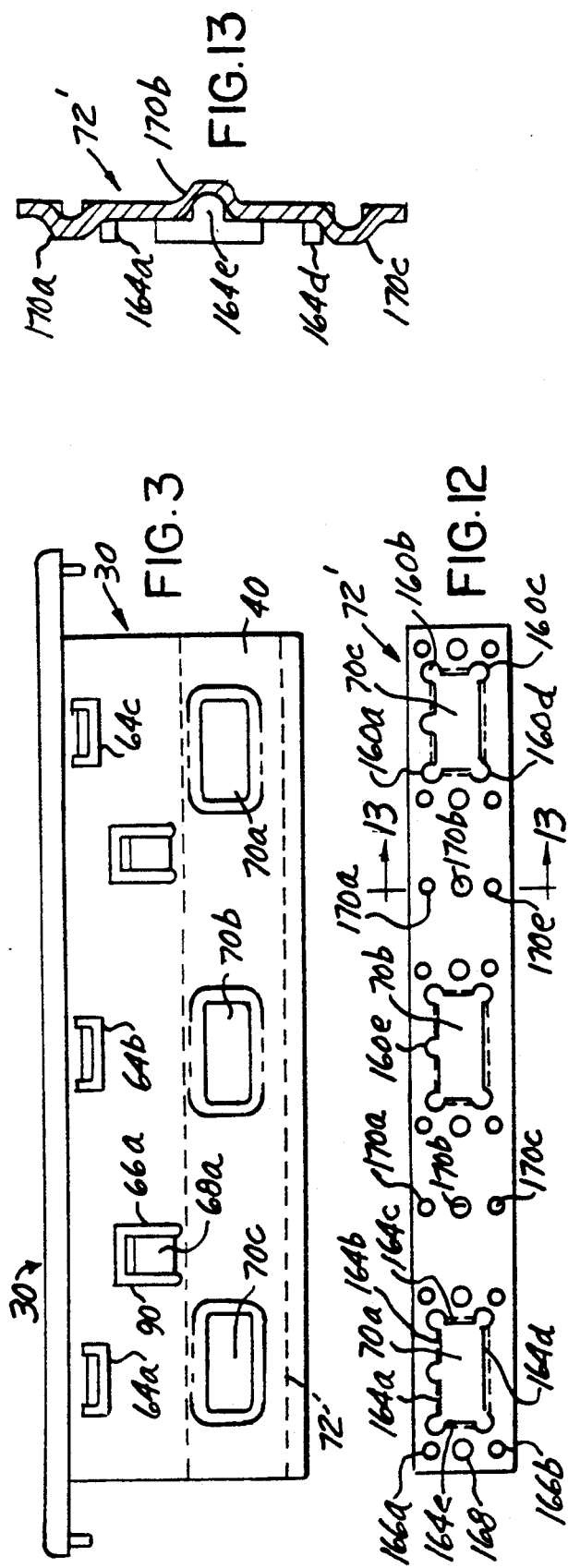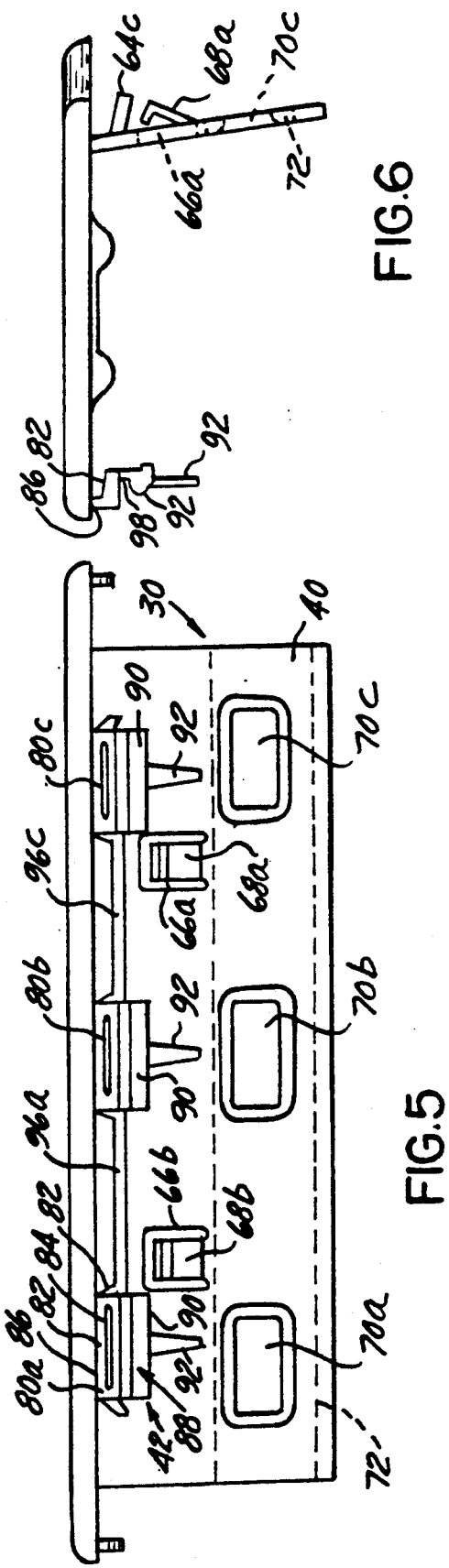

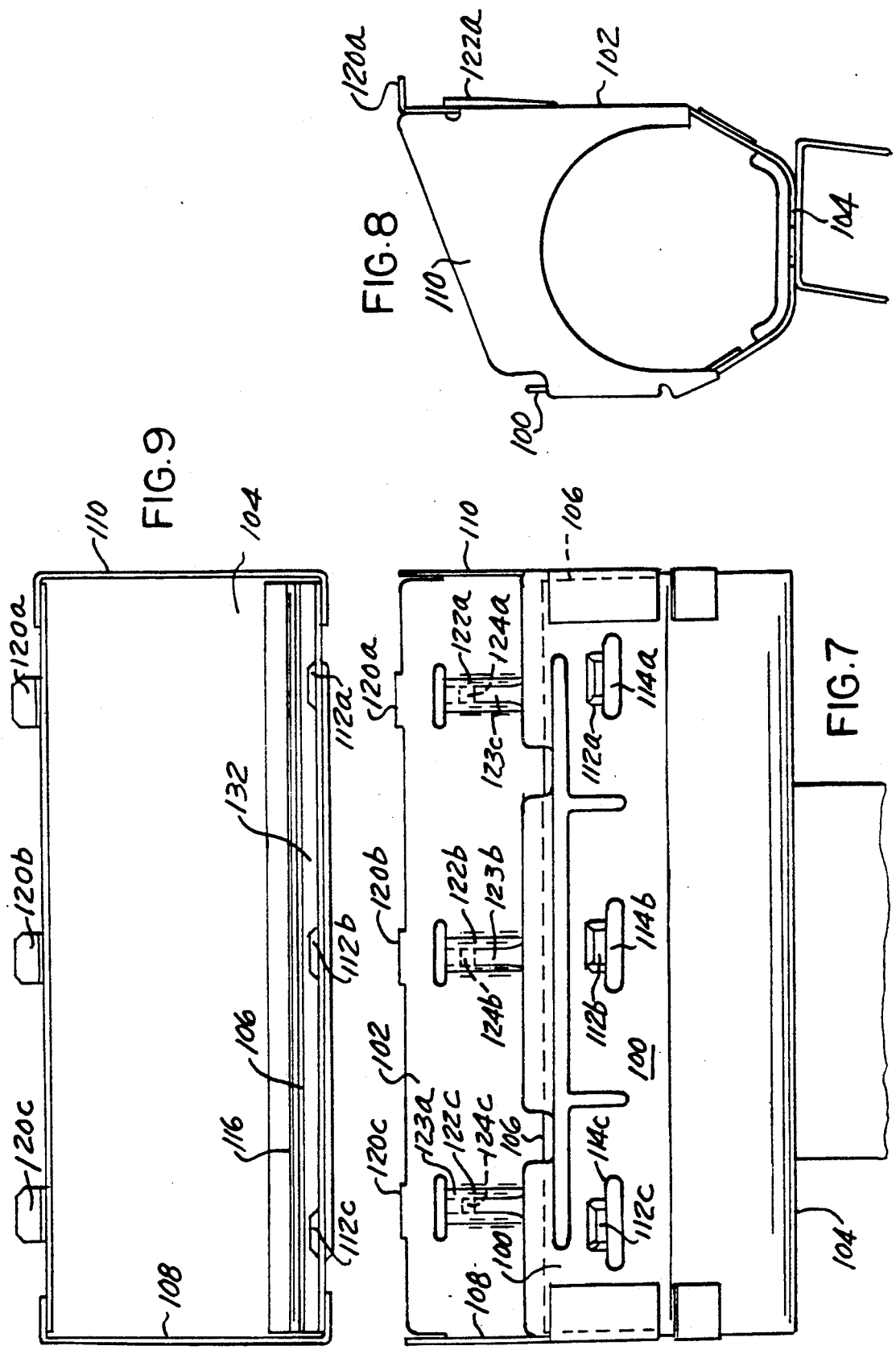

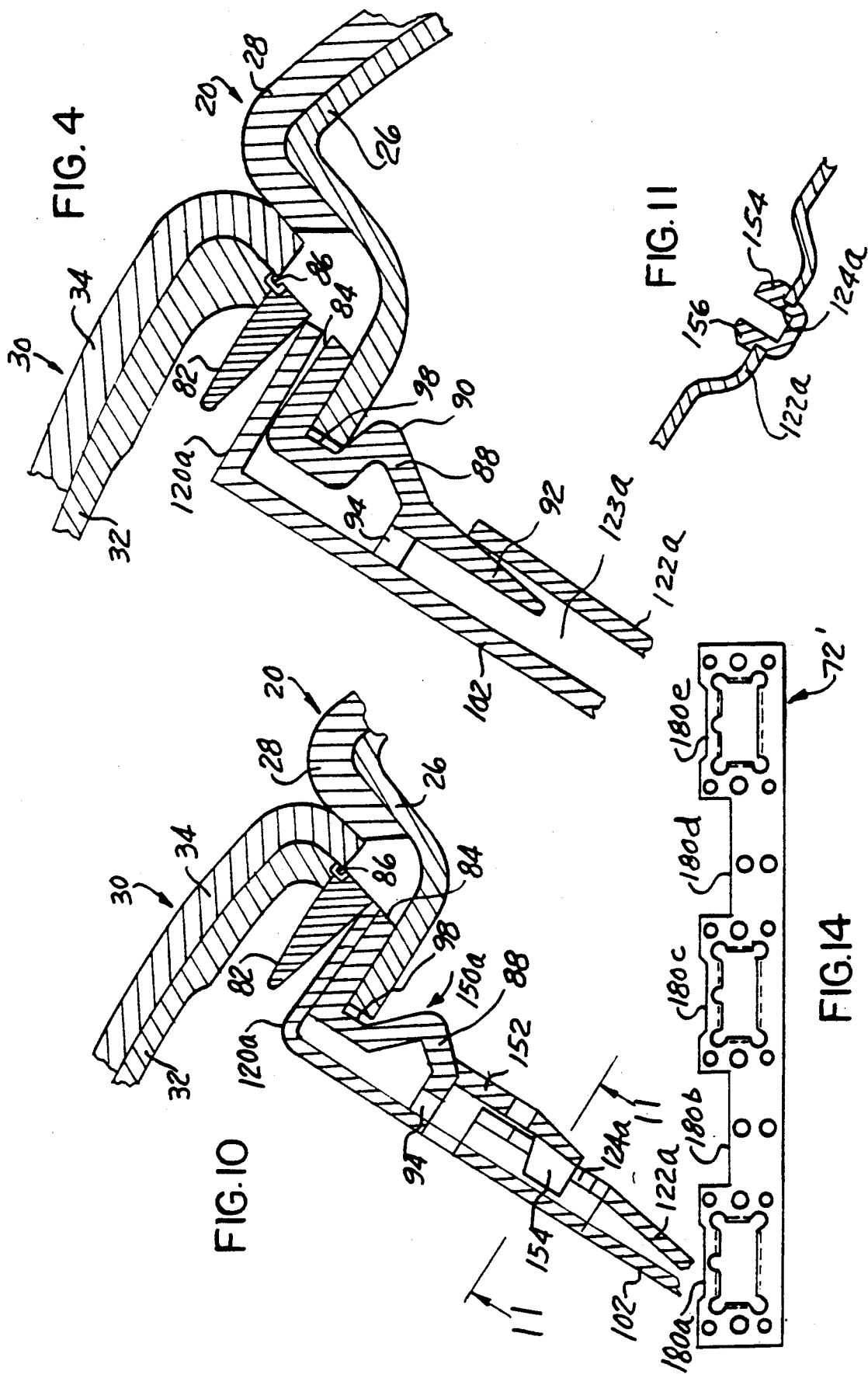

AIR BAG ASSEMBLY WITH HOUSING AND FASTENERLESS DEPLOYMENT DOOR

BACKGROUND AND SUMMARY OF THE INVENTION

The present application generally relates to an air bag safety system and more specifically to a passenger side air bag system including a housing and fastenerless deployment door.

U.S. Pat. No. 4,893,833 illustrates a passenger side deployment door having a single, flexible hinge along one side and a frangible member along another side of the cover. The frangible member breaks apart in response to air bag deployment forces permitting the cover to rotate about the hinge. The hinge and frangible member are attached to cooperating structure by bolts or rivets, received through bolt/rivet holes which makes the assembly process more complicated than necessary. In addition, the bolt holes provide a source of increased stress.

It is an object of the present invention to provide for an improved passenger side air bag deployment door and related air bag module. Accordingly, the invention comprises: an assembly for an air bag adapted to fit within an opening in a component in the interior of a vehicle such as an instrument panel. The assembly comprises a housing including a first wall and an opposite second wall, a flexible wall member secured to the first wall defining a space therebetween to receive a hinge portion of the deployment door. One of the first wall and flexible wall members include a plurality of depressions or first tabs which extend into the space to provide a means to engage and lock the hinge portion of the deployment door in place. The second wall includes at least one louver forming a pocket and a plurality of outwardly extending positioning tabs which provide a means to engage and lock in place a tear seam portion of the deployment door. More specifically, the deployment door includes a cover, an integral, flexible hinge formed proximate the junction of a hinge flange, and the cover and at least one engagement member formed as an integral part of the cover generally opposite the hinge flange defining a tear seam at the junction of the engagement member to the cover. The flange hinge includes a plurality of openings engagable with a corresponding one of the depressions or tabs when the hinge flange is inserted between the first wall and flexible wall. Each engagement member is adapted to mate with a corresponding louver, whereupon after inflation of the air bag, the air bag urges the cover outwardly breaking the tear seam permitting the cover to pivot about the hinge.

Many other objects and purposes of the invention will be clear from the following detailed description of the drawings.

BRIEF DESCRIPTION OF THE DRAWINGS

In the drawings:

FIG. 1 diagrammatically illustrates the right hand portion of a vehicle instrument panel showing a deployment door attached thereto.

FIG. 2 illustrates cross-sectional views showing many of the major components of the present invention.

FIG. 3 illustrates a rear plan view of a deployment door.

FIG. 4 illustrates a cross-sectional view of a engagement member.

FIG. 5 illustrates a front plan view of a deployment door.

FIG. 6 illustrates a side plan view of a deployment door.

FIG. 7 illustrates a front plan view of a housing.

FIG. 8 illustrates a side plan view of a housing.

FIG. 9 illustrates a top plan view of a housing.

FIG. 10 illustrates an alternate embodiment of the present invention.

FIG. 11 illustrates a cross-sectional view through section 11—11 of FIG. 10.

FIGS. 12 and 13 show an alternate embodiment of a reinforcement member.

FIG. 14 shows a further embodiment of a reinforcement member.

DETAILED DESCRIPTION OF THE DRAWINGS

FIG. 1 diagrammatically illustrates the right hand portion of a vehicle instrument panel generally shown as 20. Visible in this diagram is the top of an air bag deployment door 30 which is fit within an opening or recess 22 of the instrument panel. As can be appreciated from FIG. 1, the location of the deployment door is proximate the top of the instrument panel and as such this arrangement is often called a top mounted orientation or configuration. As can be appreciated the opening 22 can be moved forwardly as shown by arrow 24 to a front mounted configuration in which the deployment door is essentially mounted facing the occupant.

With reference to FIG. 2, there is illustrated a cross-sectional view of the instrument panel 20 showing the opening 22. Fitted within the opening 22 is the deployment door 30. As can be seen from FIG. 2, the construction of the instrument panel and that of the deployment door is essentially a layered construction. As is known in the art, the instrument panel may be made of a plastic or metal substrate shown as 26 covered with an expanded vinyl 28, foam or both. As shown the door 30 uses a thermoplastic (TPO) substrate 32 which may be covered by vinyl 34, rubber, foam and the like to match the look and feel of the instrument panel. The deployment door 30 includes an integrally formed hinge portion 40 extending from the substrate 32 and a frangible and interlocking seam portion generally shown as 42. The hinge portion 40 and the seam portion 42 are mated to a canister, housing or reaction can 44 without the use of fasteners shown as bolts or rivets. The housing 44 is typically fastened to a structural component 46 situated below the instrument panel 20. Positioned within the reaction can or housing 44 is a sleeve or retainer 50 which surrounds a gas generator 52 of known variety and is fastened by a plurality of bolts 54. An air bag 56 is mounted about the member 50. The air bag 56 may be secured in its folded configuration by utilizing a tearable fabric layer (not shown) as is also known in the art.

The hinge portion 40, includes a hinge flange 60 and a hinge 62 formed at the intersection of the hinge flange 60 with the thermoplastic substrate 32 of the deployment door or cover 30. Extending outwardly from the hinge flange 60 are a plurality of stand-offs 64a-c which are also seen in the rear plan view of FIG. 3.

As can be seen from FIG. 3 the door 30 includes three stand-offs 64a-c which extend from the hinge flange 60. Situated below and in between each of the stand-offs are a plurality of snap members 68a and 68b integrally formed as part of the hinge flange 60. As can be seen portions of the hinge flange 60, about each snap member, have been removed to form openings 66a and 66b. The hinge flange 60, which is preferably fabricated of a thermoplastic material is molded about a metal reinforcement member 72. The reinforcement member 72 and hinge flange 60 include a plurality of aligned openings 70a-c.

Reference is now made to FIGS. 4 and 5. FIG. 4 is an exploded view of part of the seam portion 42. As can be seen from FIG. 5, the seam portion 42 comprises three identical engagement members 80a, 80b, and 80c. Adjacent members 80a-80c are connected by integrally formed bars 96a and 96b to facilitate simultaneous movement of the engagement means. As each of these members are identical, only one will be described in detail. Engagement member 80a comprises a first pyramidal shaped member 82 having a central slot 84. The top portion of member 82, at its junction with the thermoplastic substrate 32, is narrowed substantially to provide a tear seam 86 which will permit the substrate to separate from the engagement members. The tear seam 86 typically would include a U-shaped or V-shaped notch to facilitate the tearing of the thermoplastic. Extending below the member 82 is another generally rectangular member 88 having a forwardly extending, curved front surface 90. Members 82 and 88 form a groove 98. As described below a portion of the instrument panel 20 is received or captured in this groove. A tab 92 extends downwardly generally from the rear of member 88. Extending rearwardly from each side of the member 88 are legs 94 only one of which is visible in FIG. 4. The legs 94 operate to provide a stand-off.

Reference is again made to FIG. 2 and as can be seen, the housing 44 comprises a generally U-shaped structure having a first outer wall 100 and a second outer wall 102 joined by bottom 104 and end walls 108 and 110. The second outer wall is higher than the first outer wall 100 to fit the contour of the illustrated instrument panel 20. Welded to the inside of the first wall 100 is a flexible wall or liner 106. The ends of this liner 106 are spaced slightly from the end walls 108 and 110 (see FIG. 7) so as not to restrict the movement of the flexible liner 106. Part of the wall 100 is removed forming a plurality of openings 114a-114c. The wall 100, just above each opening, is bent inwardly to define a tabs or recesses 112a-c. The spacing of the tabs 112a-c correspond to the spacing of the openings 70a-c on the hinge flange 60. As can also be seen in FIG. 2, the flexible wall 106 is formed with an axially extending groove 116 to enhance its rigidity. It should be appreciated that the tabs or recesses 112a-c could be formed on wall 106 instead of wall 100.

With regard to wall 102 of the housing 44, it can be seen that the wall includes a plurality of integrally formed extending tabs 120a-120c. The spacing of these tabs corresponds to the spacing between the openings or slots 84 in each of the engagement members 80a-80c formed in the cover 30. Also formed in the wall 102 are a plurality of louvers 122a-122c forming corresponding pockets 123a-c which are positioned just below each of the tabs 120a-120c. Each of the louvers 122a-122c may include an opening 124a-124c which are shown in phantom line in FIG. 7 which are pertinent to an alternate embodiment of the invention described below.

The above described components are assembled as follows: The air bag 56 is secured to the retaining member 50 and the subassembly is secured to the housing 44 such as by inserting the threaded bolts through corresponding openings within the bottom 104 of the housing and securing same by a fastener 130. The gas generator 52 is preferably inserted in the housing just prior to installation of the door 30, however, installation of the gas generator into the housing can be postponed to just prior to installation of the housing into the vehicle.

The deployment door 30 is secured to the housing 44 in the following manner: Each of the engagement members 80a-80c are inserted into corresponding louver 122a and 122b by inserting the tabs 92 within the pocket 123 end of each louver 112a-c. With the tabs 92 in place the slots 84 formed in each of the engagement members 80a-80c are slid about a corresponding one of the positioning tabs 120a-120c formed on and extending from housing wall 102. The engagement of the louvers 120a-c by the tabs prevents the engagement members from moving off of the positioning tabs. Thereafter the hinge flange 60 is positioned at the top of the space 132 defined between the wall 100 and the member 106. The cover 30 and its hinge flange 60 are pushed downwardly within the space 132 until each of the openings 70a-70c are snap fitted to a corresponding one of the tabs or recesses 112a-112c formed on the wall 100. The gas generator is installed as mentioned above and may be inserted within an opening 134 formed in the end wall 110 (see FIG. 8). While the method of securing the gas generator to the member 50 and housing 44 is not particularly pertinent to the present invention, one method may include forming the threaded bolt 54 (see FIG. 2) with internal threads. A set screw is threaded within the internal threads in the bolt 54 urging the gas generator outwardly and securing the same against member 50.

Reference is again made to FIG. 2. As previously mentioned the instrument panel 20 defines an opening 22 of sufficient size to receive the deployment door/cover 30. The instrument panel 20, and in particular the substrate structure 26, defines two oppositely positioned inwardly directed lips or flanges 140a and 140b (see FIG. 2) which effectively narrow the width of the opening 22. The assembled module comprising the deployment door 30 and housing 44 are inserted within the instrument panel opening 22 and guided downwardly. The groove 98 formed in each of the engagement members 80a-80c is positioned against and capturing lip or flange 140b. Thereafter, the module is pushed downwardly and rotated about the flange 140b until each of the standoffs 64a-64c and snap members 68a and 68b engage the top and bottom surfaces of flange 140b positioning the deployment door in its proper orientation. As can be appreciated, the distances between the top of the door/cover 30 and the grooves 98, stand-offs 64, snap members 68 as well as the positions of the various instrument panel flanges 140a and 140b, spacing to the structural component are chosen such that when the housing 44 is in place the door 30 fits into the instrument panel essentially providing a smooth continuation of the contour of the instrument panel. In addition, the openings 70a-c in the hinge flange are slightly larger than the height of the tabs 112, in the wall 100, by about +/− four millimeters. This is beneficial since when the end 31 of the door 30 abuts the instrument panel 20 during installation, the hinge flange can float slightly in the housing permitting a more accurate alignment of the end 31 of the door 30 to the instrument panel as the housing 44 is positioned.

Reference is made to FIGS. 10 and 11 which illustrate an alternate embodiment of the present invention and more specifically an alternate embodiment of the engagement members 80a-80c which interact with a modified housing 44. FIG. 10 illustrates an alternate engagement member such as 150a. The top portion of each engagement member 150a-c is identical to the top portion of engagement member 80a-c. It should be appreciated that three such members are attached to the door/cover 30. The top portion of the engagement member 150a at 86 defines a region of narrowed thickness to define a tear seam. Situated within member 82 is the opening 84. Extending downwardly is member 88 having the extending leg portion 94 forming a stand-off. Extending from the front portion of member 88 is a tab 152. Formed at a lower portion of tab 152 is a snap member 154. The cross-sectional view of the snap member 154 is shown in FIG. 11. As may be recalled with regard to the description of FIG. 7, it was mentioned that each of the louvers 122a-122c may include an opening 124a-124c. FIG. 9 also illustrates the wall 102 and one of the louvers such as 122a having the opening 124a. The snap member 154 formed on the tab 152 is inserted within a corresponding opening such as 124a deforming an integral, flexible wall portion 156. After the snap member is seated the wall portion 156 (see FIG. 11) secures the snap member 154 in the opening 124 of each louver 122 as illustrated. The process of assembling a door 30 which includes the tab 152 and snap member 154 to the housing 44 is slightly different than the above described assembly process for the first embodiment of the invention. It is envisioned that the hinge flange 60 is first inserted within the space 132 between the wall 100 and member 102. After the flange 60 is inserted within the space 132, each of the engagement members 150a-150c on the other side of the door/cover 30 are brought closer to corresponding tabs or recesses 120a-120c formed on and extending from the second wall 102. The engagement members 150a-150c are moved, typically rotated, to permit each tab 120a-120c to fit within the corresponding slot 84 of the engagement member 150a-c temporarily positioning the door 30 to the top of the housing 44. Thereafter each tab 154 is inserted within its corresponding opening 124a-124c. With the tab 154 locked or snapped in place, the door 30 and in particular the hinge flange 60 is pushed further into the opening 132 until the hinge flange openings 70a-c snap fit and secured to the tabs or recesses 112a-112c on the first wall 100 of the housing 44.

Reference is made to FIGS. 12 and 13 which show an alternate embodiment of a reinforcement member 72'. The member 72' includes the openings 70a-c. Positioned about the openings are a plurality of cut-outs 160a-e. The cut-outs 160 permit the material of the reinforcement member 72' to be bent (rearwardly as seen in FIG. 12) to form a plurality of flanges 164a-e to provide a greater area of metal contact with the tabs 112a-c which increases the retention strength of the hinge flange 60.

Positioned on either side of each opening 70a-c is a forward extending (up from the plane of the paper in FIG. 12) boss or dimple 166a, an opening 168 and another forward boss or dimple 166b. Positioned between adjacent openings 70a-c, and as shown more clearly in FIG. 13, is an inward directed boss 170a, another outward directed boss or dimple 170b and another inward boss 170c. The various bosses and dimples provide for better adhesion of the thermoplastic to the reinforcement member 72' during molding. Further, the various bosses 166a,b and 170a,b,c increase the strength of the reinforcement member 72, to be more resistant to twisting or warping when subjected to pressurized thermoplastic within a mold during the molding process. FIG. 14 shows a further embodiment of the reinforcement member 72'. As can be seen the reinforcement member of FIG. 14 is identical to that of FIG. 12 except that the top surface includes a number of cut-outs 180a-e which increases thermoplastic utilization thereby making the hinge flange 60 more flexible.

Many changes and modifications in the above described embodiment of the invention can, of course, be carried out without departing from the scope thereof. Accordingly, that scope is intended to be limited only by the scope of the appended claims.

We claim:

1. An assembly for an air bag (56) adapted to fit within an opening (22) of a vehicle part (20) comprising:
   a housing (44) comprising: a first wall (100) and an opposite second wall (102), a flexible wall member (106) secured to the first wall (100) defining a space (132) therebetween for receipt of a hinge flange, the first wall (100) including a plurality of first tabs (112) extending into the space (132), the second wall (102) including a plurality of second tabs (120) extending outwardly therefrom;
   cover means (30, 40, 42) for enclosing the housing including means received in the space (132) including a hinge portion (40) engaged with the first tabs (112) to provide a snap connection therebetween and a seam portion (42) including first means engaged with the second tabs, the first means including a portion which tears apart in response to deployment forces generated by an inflating air bag.

2. The assembly as defined in claim 1 wherein the cover means comprises a cover (30), the hinge flange (60) extending from the cover, a flexible hinge (62) formed proximate the junction of the hinge flange (60) and the cover (30), and at least one engagement member (80) formed as an integral part of the cover (30) generally opposite the hinge flange (60) defining a tear seam (86) at the junction of the member (80) to the cover, the hinge flange (60) including a plurality of receptacles (70) engagable with a corresponding one of the first tabs (112) when the hinge flange (60) is inserted between the first wall and flexible wall.

3. The assembly as defined in claim 2 wherein the second wall includes at least one louver (122) forming a pocket (123) thereon and wherein said at least one engagement member (80) includes an engagement tab (92) extending therefrom, whereupon inflation of the air bag, the air bag urges the cover outwardly breaking the tear seam (86) permitting the cover to pivot about the hinge (62).

4. The assembly as defined in claim 2 wherein each engagement member (80) includes a slot (84) into which a corresponding one of the second tabs enters providing means for mating the cover (30) to the second wall (102).

5. The assembly as defined in claim 3 wherein the engagement tab (92) of said at least one engagement member is positioned in a corresponding pocket (123) formed by a louver (122) such that the engagement tab and louver cooperate to secure each engagement member to the second wall (102).

6. The assembly as defined in claim 3 wherein said at least one engagement member (80) includes an extending tab (152), each tab (152) including a flexible snap portion (154) formed thereon, and wherein the second side (102) includes an opening (124) on an outward face thereof, wherein each snap portion (154) is snapped into a corresponding opening (124).

7. The assembly as defined in claim 3 wherein the vehicle part is a vehicle instrument panel (20) having the opening (22), and wherein the instrument panel proximate the opening (22) includes two inwardly directed, oppositely positioned flanges (140a,b) and wherein said at least one engagement member (80) defines a groove (98) adapted to engage an edge of one of the flanges (140b), and wherein the hinge flange (60) includes a plurality of outwardly extending stand-offs (64) and a plurality of flexible snap members (68) positioned below and between the stand-offs (64), wherein the other of the flanges (140a) is received between a lower edge of the stand-offs (64) and an upper edge of the flexible snap members.

8. The assembly as defined in claim 3 wherein the hinge flange (60) includes a metal insert (72) to increase the strength of the hinge flange, the insert including a plurality of receptacles corresponding to the plurality of receptacles (70) of the hinge flange.

* * * * *